(12) United States Patent
Kuan et al.

(10) Patent No.: US 7,255,459 B2
(45) Date of Patent: Aug. 14, 2007

(54) LIGHT EMITTING DIODE LIGHT SOURCE

(75) Inventors: Da-Shuang Kuan, Hsinchu County (TW); Tony Whitehead, Hsinchu (TW); Chi-Tai Meng, Taoyuan County (TW)

(73) Assignee: United Microdisplay Optronics Corp., Hsinchu (TW)

( * ) Notice: Subject to any disclaimer, the term of this patent is extended or adjusted under 35 U.S.C. 154(b) by 0 days.

(21) Appl. No.: 11/306,100

(22) Filed: Dec. 16, 2005

(65) Prior Publication Data

US 2007/0139922 A1    Jun. 21, 2007

(51) Int. Cl.
*F21V 7/00* (2006.01)

(52) U.S. Cl. ...................................... 362/247; 362/298

(58) Field of Classification Search ................ 362/294, 362/296, 297, 231, 800, 247, 298
See application file for complete search history.

(56) References Cited

U.S. PATENT DOCUMENTS 5,136,483 A * 8/1992 Schoniger et al. .......... 362/545

* cited by examiner

*Primary Examiner*—Ali Alavi
(74) *Attorney, Agent, or Firm*—Jianq Chyun IP Office

(57) ABSTRACT

A light emitting diode light source including a reflective cover and a plurality of light emitting diodes is provided. The reflective cover has an inner surface and an opening for irradiating light. The light emitting diodes are disposed on the inner surface of the reflective cover. The light emitted from the light emitting diodes is incident upon the inner surface of the reflective cover and then reflected toward the opening from the inner surface.

9 Claims, 1 Drawing Sheet

LIGHT EMITTING DIODE LIGHT SOURCE

BACKGROUND OF THE INVENTION

1. Field of the Invention

The present invention relates to a light source device. More particularly, the present invention relates to a light emitting diode light source.

2. Description of the Related Art

Because light emitting diode (LED) has a long working life and a low power rating, LED has found an increasing number of applications including large electronic bill boards, street lights and car lights, for example. At present, manufacturers are aiming towards producing LED with a higher brightness level and a lower light wear out rate. Moreover, LED is also expected to work as a light source for high luminosity projectors such as the digital light processing (DLP) projectors, the liquid crystal display (LCD) projectors and other innovative colored high-luminosity optical projection devices.

Because the dispersion angle of the light emitted from the light emitting diode often exceeds 120 degree, it is difficult to concentrate the light emitted from the light emitting diode. However, if the light emitted from the light emitting diode is not concentrated, the brightness level of a light source system using light emitting diodes as the light source is subjected to substantial limitation.

At present, one method for increasing the brightness of a light emitting diode light source is to increase the supply electric potential to the light emitting diodes. Yet, the defects of this method is that not only will the power rating of the light source system increase, but the bulk of the light source system will also increase due to the need for additional external circuits. A large and bulky light source is a big disadvantage for the miniaturization of all kinds of display or illumination equipment.

SUMMARY OF THE INVENTION

Accordingly, at least one objective of the present invention is to provide a light emitting diode light source capable of improving the problem of insufficient brightness in a conventional light emitting diode light source due to the inability to concentrate the light.

To achieve these and other advantages and in accordance with the purpose of the invention, as embodied and broadly described herein, the invention provides a light emitting diode light source comprising a reflective cover and a plurality of light emitting diodes. The reflective cover has an inner surface and an opening for irradiating light. The light emitting diodes are disposed on the inner surface of the reflective cover. The light emitted from the light emitting diodes is incident upon the inner surface of the reflective cover and then reflected toward the opening from the inner surface.

According to one preferred embodiment of the present invention, the light emitting diodes are selected from a group consisting of light emitting diodes that emit red light, green light, blue light, white light, cyan light, yellow light, magenta light or any combination of the above colors.

According to one preferred embodiment of the present invention, the light emitting diodes are organized to form a ring around the inner surface of the reflective cover.

According to one preferred embodiment of the present invention, the light emitting diode light source further comprises at least an optical element disposed at the light irradiation opening of the reflective cover. In one embodiment, the optical element includes a field lens.

According to one preferred embodiment of the present invention, the light emitting diode light source further comprises a cooling device disposed on an outer side of the reflective cover.

According to one preferred embodiment of the present invention, the inner surface of the reflective cover further includes a reflective coating layer thereon. The reflective coating layer includes a mirror coating material.

According to one preferred embodiment of the present invention, the reflective cover is fabricated using a metallic material.

In the present invention, the combination of the light emitting diodes and the reflective cover concentrates the light energy produced by the light emitting diodes. Consequently, the light emitting diode light source can have a sufficiently high brightness level.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
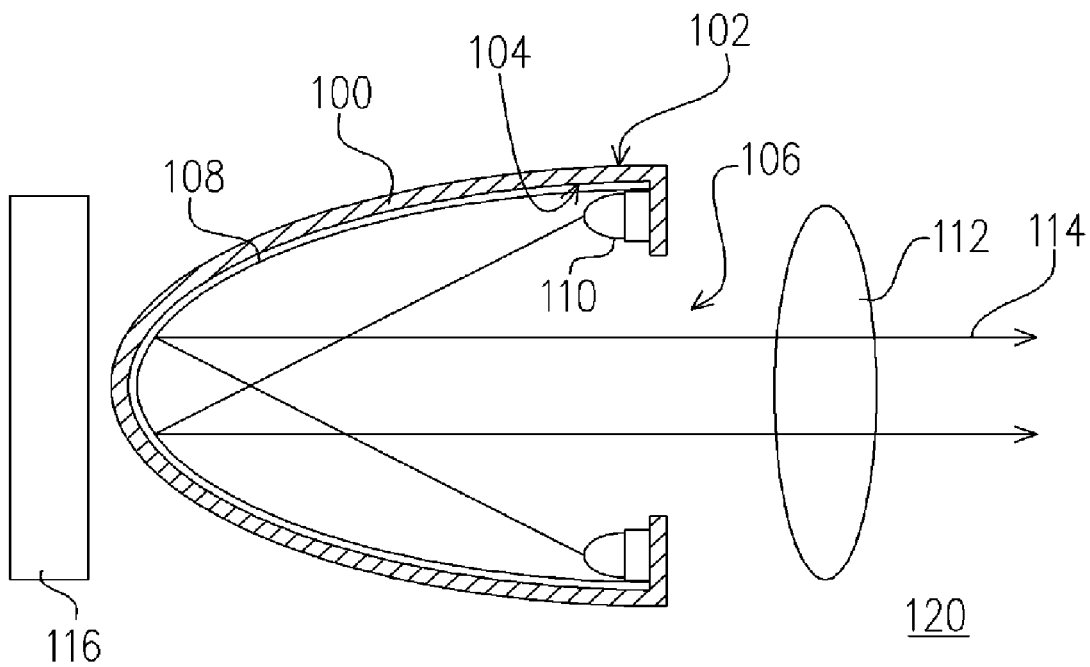
FIG. 1 is a schematic cross-sectional view of a light emitting diode light source according to one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic cross-sectional view of a light emitting diode light source according to one preferred embodiment of the present invention. As shown in FIG. 1, the light emitting diode light source 120 in the present invention comprises a reflective cover 100 and a plurality of light emitting diodes 110. The reflective cover 100 has an outer surface 102, an inner surface 104 and a light irradiation opening 106. The reflective cover 100 is fabricated using any material with known reflective property such as a metallic material. Here, the reflective cover 100 has a curved profile and the front end of the reflective cover 100 has an opening, that is, a light irradiation opening 106. The back end of the reflective cover 100 has a curved corner surface.

In one preferred embodiment, the inner surface 104 of the reflective cover 100 further includes a reflective coating layer 108 thereon for increasing the reflectivity of the inner surface 104 of the reflective cover 100. The reflective coating layer 108 is fabricated using a mirror coating material, for example.

Figure 2:
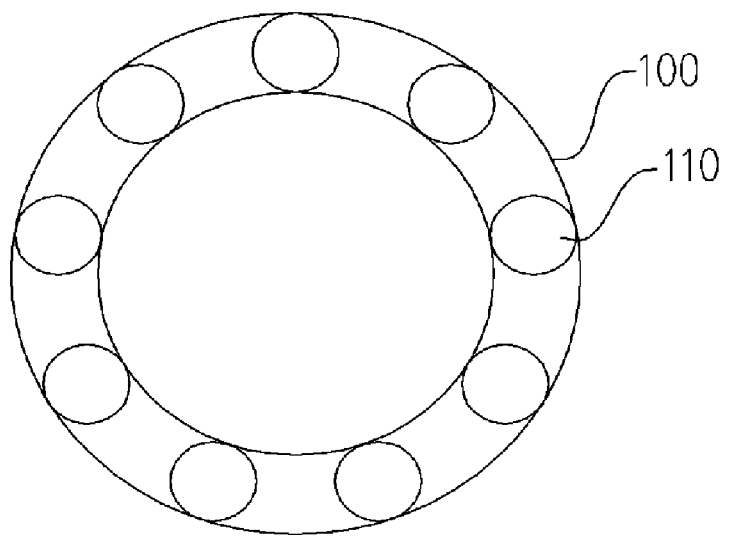
FIG. 2 is a front view of the light emitting diode light source in FIG. 1.

The light emitting diodes 110 are disposed on the inner surface 104 of the reflective cover 100. Furthermore, the light emitted from the light emitting diodes 110 is incident upon the inner surface 104 of the reflective cover 100 and then reflected from the inner surface 104 of the reflective cover 100 toward the light irradiation opening 106. Here, the light emitting diodes 110 can be disposed anywhere on the inner surface 104 of the reflective cover 100 as long as the light 114 emitted from the light emitting diode 110 can reach the inner surface 104 and reflect from there toward the light irradiation opening 106. Thus, the present invention has no particular restrictions regarding the orientation or positioning of the light emitting diodes 110. In one embodiment, the light emitting diodes 110 can be positioned around the inner surface 104 of the reflective cover 100 in the form of a ring as shown in FIG. 2. FIG. 2 is a front view of the light emitting diode light source in FIG. 1. In another embodiment, the light emitting diodes 110 can be disposed on the surface 104 (not shown) of the reflective cover 100 in an irregular manner.

It should be noted that the light emitting diodes 110 disposed on the inner surface 104 of the reflective cover 100 are selected from a group consisting of light emitting diodes that emits red light, green light, blue light, white light, cyan light, yellow light, magenta light or some combination of the above colors. In other words, the light emitting diodes 110 on the inner surface 104 of the reflective cover 100 can emit one, two, three or more types of colored lights depending on the actual color requirements of the light source. For example, if the light emitting diode light source 120 needs to emit white light, the light emitting diodes 110 on the inner surface 104 of the reflective cover 100 can be light emitting diodes that emits white light. Alternatively, light emitting diodes that emits red light, green light and blue light can be disposed on the inner surface 104 of the reflective cover 100 so that the lights from these light emitting diodes 110 are blend together to produce white light. Similarly, if the light emitting diode light source 120 needs to emit light of another color, a suitable combination of red, green, blue, white, cyan, yellow and magenta light emitting diodes can be selected and blended together to produce the desired color.

In the present invention, the combination of a plurality of light emitting diodes 110 and a reflective cover 110 is able to concentrate the light emitted from the light emitting diodes 110 so that the light emitting diode light source 120 can have sufficiently high brightness level. Thus, the present invention can resolve the problem of a conventional light emitting diode light source not having enough brightness level. Furthermore, the present invention does not require a high electric potential for increasing the brightness level. Hence, aside from reducing power consumption, there is no need to incorporate additional external circuits that might increase the volume of the light source and render the light source bulky.

Aside from the light emitting diodes 110 and the reflective cover 100, the light emitting diode light source 120 of the present invention may further include an optical element 112 disposed outside the light irradiation opening 106 of the reflective cover 100. The optical element 112 can be a field lens for focusing the light 114 emitted by the light emitting diodes 110 and reflected by the reflective cover 100 even more, for example.

In addition, the light emitting diode light source 120 of the present invention may further include a cooling device 116 disposed just outside the reflective cover 100. The cooling device 116 can be disposed on the backside of the reflective cover 100 or tiled on the outer surface 102 of the reflective cover 100. The cooling device 116 carries away the heat generated by the light emitting diode light source while in operation.

The light emitting diode light source 120 of the present invention can be applied to a variety of products that demands a light source. For example, the light emitting diode light source can be used in the light source system of a display, illuminating equipment and lighting equipment for producing special lighting effects and so on.

In summary, the light emitting diode light source formed by the special arranging the light emitting diodes inside the reflective cover is able to concentrate the light emitted from the light emitting diodes. Hence, the light emitting diode light source can have a sufficiently high brightness level for illumination. In addition, the light emitting diode light source has no need for a high electric potential to increase the brightness level of the light emitting diodes. Thus, aside from saving electric power, the light emitting diode light source is less bulky.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light emitting diode light source, comprising:
a reflective cover, having an inner surface and a light irradiation opening; and
a plurality of light emitting diodes, disposed on the inner surface of the reflective cover and having an orientation opposite to a direction of the light irradiation opening of the reflective cover, wherein the light emitted from the light emitting diodes is incident upon the inner surface and reflected from the inner surface toward the light irradiation opening.

2. The light emitting diode light source of claim 1, wherein the light emitting diodes are selected from a group of light emitting diodes that emits red light, green light, blue light, white light, cyan light, yellow light, magenta light and some combination of the above colors.

3. The light emitting diode light source of claim 1, wherein the light emitting diodes are disposed around the inner surface of the reflective cover in the form of a ring.

4. The light emitting diode light source of claim 1, wherein the light source further includes at least an optical element disposed outside the light irradiation opening of the reflective cover.

5. The light emitting diode light source of claim 4, wherein the optical element includes a field lens.

6. The light emitting diode light source of claim 1, wherein the light source further includes a cooling device disposed outside the reflective cover.

7. The light emitting diode light source of claim 1, wherein the inner surface of the reflective cover further includes a reflective coating layer thereon.

8. The light emitting diode light source of claim 7, wherein the reflective coating layer includes a mirror coating material.

9. The light emitting diode light source of claim 1, wherein the material of the reflective cover comprises a metallic material.

* * * * *